United States Patent
Yoshida et al.

(10) Patent No.: US 10,270,931 B2
(45) Date of Patent: Apr. 23, 2019

(54) PRINTER AND PRINTER CONTROL METHOD

(71) Applicant: SEIKO EPSON CORPORATION, Tokyo (JP)

(72) Inventors: Ryo Yoshida, Matsumoto (JP); Toshiaki Koike, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/718,709

(22) Filed: Sep. 28, 2017

(65) Prior Publication Data
US 2018/0091659 A1  Mar. 29, 2018

(30) Foreign Application Priority Data

Sep. 29, 2016  (JP) .................................. 2016-191595

(51) Int. Cl.
*G06F 3/12* (2006.01)
*H04N 1/00* (2006.01)

(52) U.S. Cl.
CPC ......... *H04N 1/0097* (2013.01); *H04N 1/0049* (2013.01); *H04N 1/00397* (2013.01); *H04N 1/00485* (2013.01)

(58) Field of Classification Search
CPC ............. H04N 1/0097; H04N 1/00397; H04N 1/0049; G06F 3/1255; G06F 3/1257; G06F 3/1258; G06F 3/127
See application file for complete search history.

(56) References Cited

U.S. PATENT DOCUMENTS

| | | | |
|---|---|---|---|
| 2002/0071322 A1 | 6/2002 | Hanyu | |
| 2003/0202010 A1* | 10/2003 | Kerby | G06F 3/1205 715/744 |
| 2004/0105115 A1* | 6/2004 | Edwards | G06K 15/16 358/1.13 |
| 2005/0024406 A1* | 2/2005 | Otsuki | B41J 11/008 347/14 |
| 2007/0044097 A1 | 2/2007 | Hanyu | |
| 2012/0162691 A1* | 6/2012 | Maeda | H04N 1/00411 358/1.14 |
| 2013/0155451 A1 | 6/2013 | Nakahara | |

FOREIGN PATENT DOCUMENTS

| | | |
|---|---|---|
| JP | 09-135319 A | 5/1997 |
| JP | 2002-149205 A | 5/2002 |
| JP | 2002-175194 A | 6/2002 |
| JP | 2003-167714 A | 6/2003 |
| JP | 2016-105646 A | 6/2016 |

* cited by examiner

*Primary Examiner* — Moustapha Diaby
(74) *Attorney, Agent, or Firm* — George C. Beck (57) ABSTRACT

The processor of a printer prints a setting value settable in a setting item of one in which a setting value is set on a print medium on the basis of input to an input section in a setting mode for setting a setting value in the setting item of one. If the first setting value of the setting item of one is stored in a memory, the processor causes a printing mechanism to print a first image in association with the setting value corresponding to the first setting value of the setting item of one out of the setting values to be printed. If the first setting value is not stored, the processor causes the printing mechanism to print the first image in association with the setting value corresponding to a second setting value of the setting item of one out of the setting values to be printed.

12 Claims, 7 Drawing Sheets

PRINTER AND PRINTER CONTROL METHOD

BACKGROUND

1. Technical Field

The present invention relates to a printer and a method of controlling a printer.

2. Related Art

To date, regarding a printer, a printer that stores a setting value in a setting item and outputs the stored setting value on a display has been provided (for example, refer to JP-A-2002-175194).

In a printer without having a display panel, such as a liquid crystal panel, or the like, one of the problems is that it is not possible for a user to accurately set a setting value at the time of setting a setting value in a setting item.

SUMMARY

An advantage of some aspects of the invention is that it provides a printer enabling a user to accurately perform setting even if the printer does not include a display panel.

According to an embodiment of the invention, there is provided a printer including: a display section including not a display panel but an LED; a printing mechanism configured to print on a print medium; an input section configured to receive input; for setting items, a memory capable of storing a current setting value being set at this time and updatable, a first setting value set at a first timing, and a second setting value set at a second timing earlier than the first timing; and in a setting mode, if the first setting value of a setting item of one is stored in the memory, a processor configured to cause the printing mechanism to print a first image in association with the first setting value of the setting item of one, else if the first setting value of the setting item of one is not stored in the memory, the processor configured to cause the printing mechanism to print the first image in association with the second setting value of the setting item of one stored in the memory, and the processor configured to update the current setting value of the first setting item on the basis of input to the input section.

With the configuration of the embodiment of the invention, if a first setting value is stored in a memory, it is possible for a user to recognize a first setting value out of the setting values settable in a setting item on the basis of a first image printed on a print medium. If a first setting value is not stored in the memory (including a case where a first setting value is a null value (null value or empty value)), it is possible for a user to recognize a second setting value. It is possible for the user to accurately select a setting value to be set in the setting item on the basis of the recognition, and to set the selected setting value in the setting item. That is to say, with the above-described configuration, it is possible for a printer including a display section that is not a display panel but an LED to print with suitable information regarding the setting on a print medium, and thereby it is possible for the user to accurately perform the setting.

In the above-described embodiment of the invention, the processor may be configured to print a second image different from the first image in association with the current setting value of the setting item of one stored in the memory.

With the configuration of the embodiment of the invention, it may be possible for the user to recognize the current setting value out of the setting values settable in the setting item on the basis of the second image printed on the print medium, and thus to accurately perform the setting on the basis of the recognition.

In the above-described embodiment of the invention, the first setting value may be stored in the memory at a shipping stage, and the second setting value may be stored in the memory before being implemented on a substrate or after being implemented on the substrate at the manufacturing stage.

With the configuration of the embodiment of the invention, at the time of printing an image regarding the setting for a print medium, it is possible to preferentially add a first image to the first setting value set in accordance with the use mode at a shipping stage rather than an initial value set at the time of manufacturing out of the setting values settable in a setting item.

The printer according to the embodiment of the invention may further include a communicator configured to communicate with an external device, wherein when for the setting item of one, the processor receives a control command instructing to store the current setting value as the first setting value via the communicator, the processor may store the current setting value of the setting item of one as the first setting value in the memory on the basis of the received control command.

With the configuration of the embodiment of the invention, it is possible to store the current setting value in the memory as the first setting value by transmitting a control command from an external device to the printer.

In the above-described embodiment of the invention, the first setting value includes involvement in a setting of font data stored in the memory.

In the above-described embodiment of the invention, when the first setting value of the setting item of one stored in the memory is a null value, the processor may determine that the first setting value is not stored in the memory.

In the above-described embodiment of the invention, the processor may control the printing mechanism so as to print the first image on a same line with the first setting value or the second setting value.

According to another embodiment of the invention, there is provided a method of controlling a printer including a display section including not a display panel but an LED, a printing mechanism configured to print on a print medium, an input section configured to receive input, and for setting items, a memory capable of storing a current setting value being set at this time and updatable, a first setting value set at a first timing, and a second setting value set at a second timing earlier than the first timing, the method including: in a setting mode, if the first setting value of a setting item of one is stored in the memory, causing the printing mechanism to print a first image in association with the first setting value of the setting item of one, else if the first setting value of the setting item of one is not stored in the memory, causing the printing mechanism to print the first image in association with the second setting value of the setting item of one stored in the memory, and updating the current setting value of the setting item of one on the basis of input to the input section.

With the configuration of the embodiment of the invention, if the first setting value is stored in the memory out of the setting values settable in the setting item, it is possible for the user to recognize the first setting value on the basis of the first image printed on the print medium. Else if the first setting value is not stored in the memory, it is possible for the user to recognize the second setting value. It is possible for the user to accurately select a setting value to be set in the setting item on the basis of the recognition, and to set the selected setting value in the setting item. That is to say, with the above-described configuration, it is possible for a printer including a display section that is not a display panel but an LED to print with suitable information regarding the setting on a print medium, and thereby it is possible for the user to accurately perform the setting.

BRIEF DESCRIPTION OF THE DRAWINGS

The invention will be described with reference to the accompanying drawings, wherein like numbers reference like elements.

DESCRIPTION OF EXEMPLARY EMBODIMENTS

In the following, a description will be given of an embodiment of the invention with reference to the drawings.

Figure 1:
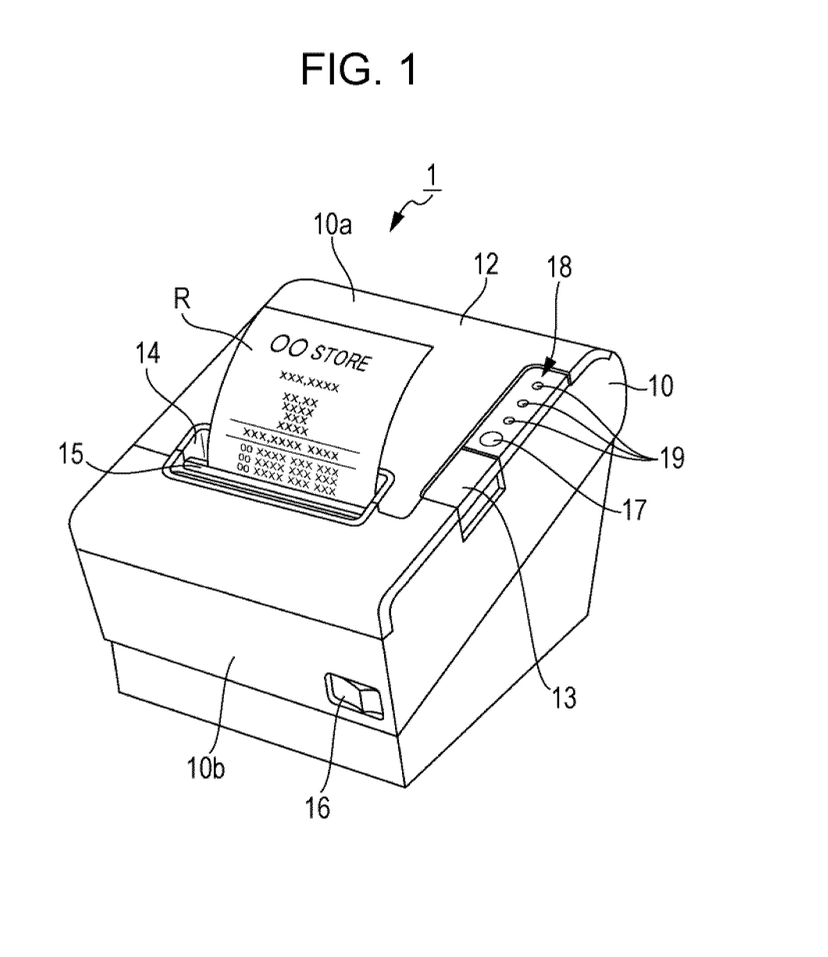
FIG. 1 is a perspective outer view of a printer according to an embodiment.

FIG. 1 is a perspective outer view of a printer 1 according to the present embodiment.

The printer 1 is a line thermal printer in which roll paper R (print medium) is accommodated in the housing 10, and an image is printed on the roll paper R by a line-type thermal head.

As illustrated in FIG. 1, an upper face 10a of the housing 10 is provided with a cover 12 that can be opened/closed. The cover 12 becomes an open state by pressing a pressing-down lever 13 disposed on the upper face 10a. When the cover 12 is in the open state, an accommodation section that accommodates the roll paper R is exposed in the housing 10, and thus it is possible to replenish or replace the roll paper R.

The upper face 10a of the housing 10 of the printer 1 is provided with an outlet 14 that ejects the roll paper R after the printing. At the position corresponding to the outlet 14, a cut blade 15 that cuts the roll paper R is disposed.

The upper face 10a of the housing 10 of the printer 1 is provided with a panel 18. The panel 18 is provided with an operation switch 17, which is a press-type switch, and a plurality of LEDs 19 that display the states of the printer 1, and the like.

The front face 10b of the housing 10 of the printer 1 is provided with a power switch 16 that turns on/off the power to the printer 1.

As described above, the housing 10 of the printer 1 according to the present embodiment is provided with the power switch 16 and the operation switch 17 as user operable switches without opening the cover 12 while not provided with the other switches. Also, the printer 1 does not include a display panel that can display information, such as a liquid-crystal display panel, an organic EL panel, or the like. Thereby, the housing 10 is miniaturized.

Figure 2:
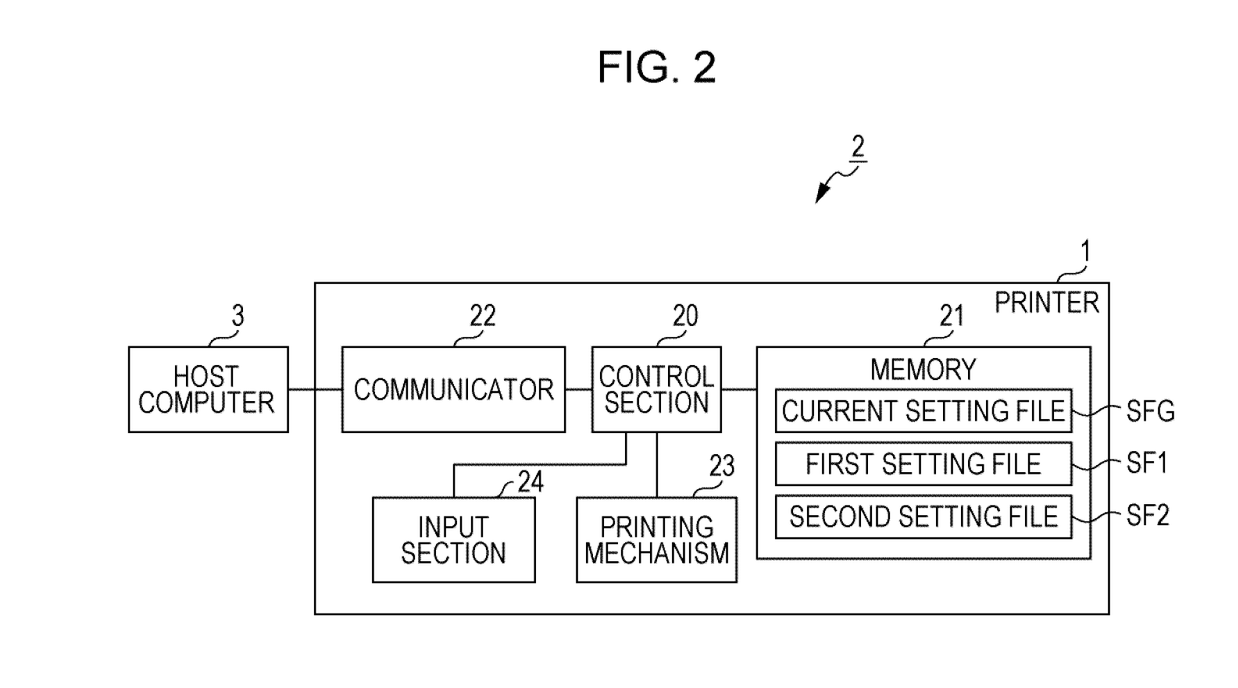
FIG. 2 is a block diagram illustrating a functional configuration of a printing system.

FIG. 2 is a block diagram illustrating a functional configuration of a printing system 2 according to the present embodiment.

As illustrated in FIG. 2, the printing system 2 is a system including a host computer 3 (external device) and the printer 1, and in which the printer 1 performs printing under the control of the host computer 3. The printing system 2 is disposed at a checkout counter at a store, for example, a supermarket, a convenience store, a restaurant, or the like, and issues a receipt in accordance with a payment made at the checkout counter.

As illustrated in FIG. 2, the printer 1 includes a control section 20 (processor), a memory 21, a communicator 22, a printing mechanism 23, and an input section 24. These sections are implemented on the internal substrate of the printer 1.

The control section 20 includes a CPU (processor), a ROM, such as a flash ROM, which is a nonvolatile memory, or the like, a RAM, which is a volatile memory, an ASIC, a signal processing circuit, and the like, and controls each section of the printer 1. The control section 20 performs processing by the cooperation of hardware and software, for example, the CPU reads a program, such as firmware, or the like stored in stored in the memory 21, such as the ROM, the RAM, or the like and performs processing. Also, for example, the processing is performed by the functions implemented in the ASIC. Also, for example, the signal processing circuit carries out signal processing to perform the processing.

The memory 21 stores various kinds of data. For example, the CPU reads various kinds of data stored in the ROM, writes the data in the RAM, and performs operation using the RAM, and the like. The memory 21 stores a current setting file SFG, a first setting file SF1, and a second setting file SF2. In the following, in the case of not distinguishing the current setting file SFG, the first setting file SF1, and the second setting file SF2, the setting files are referred to as a "setting file". Descriptions will be given later of the current setting file SFG, the first setting file SF1, and the second setting file SF2.

The communicator 22 is connected to the host computer 3 and communicates with the host computer 3 in accordance with a predetermined communication standard under the control of the control section 20. The communication standard used between the host computer 3 and the printer 1 may be a standard related to wired communication or a standard related to wireless communication. A standard related to wired communication is for example, USB, a serial communication standard other than USB, such as RS232C, or the like, a parallel communication standard, such as IEEE1284, or the like, and Ethernet (registered trademark). Also, a standard related to wireless communication is a communication standard, for example, Wi-Fi (registered trademark), or the like, or a standard related to short-distance wireless communication, such as Bluetooth (registered trademark), or the like.

The printing mechanism 23 includes at least a print mechanism, a transport mechanism, and a cutting mechanism. The print mechanism includes a thermal head and the other elements related to printing. The transport mechanism includes a transport roller that transports the roll paper R accommodated in the printer 1 in a predetermined direction, and the other elements related to the transport of the roll paper. The cutting mechanism includes the cut blade 15 (refer to FIG. 1) that cuts the roll paper R, and the other elements related to the cutting of the roll paper. Under the control of the control section 20, it is possible for the printing mechanism 23 to transport the roll paper R in a predetermined direction by the transport mechanism, to print an image on the roll paper R by the print mechanism, and cut the roll paper R at a predetermined position by the cutting mechanism so as to issue a slip of paper on which the image has been printed.

The input section 24 includes the power switch 16, the operation switch 17, and a cover switch, detects operation on these switches, and outputs the operation to the control section 20. The control section 20 performs processing corresponding to the operation on the switches on the basis of the input from the input section 24.

The host computer 3 is a computer that controls the printer 1. A predetermined application and a printer driver corresponding to the printer 1 are installed on the host computer 3. The host computer 3 controls the printer 1 by the functions of the predetermined application, the printer driver, and the other accompanying programs.

Next, a description will be given of the operation of the host computer 3 and the printer 1 when the printer 1 carries out printing under the control of the host computer 3.

In the following, a description will be given of the operation of the host computer 3 and the printer 1 by taking, as an example, the case where the printing system 2 is disposed at a checkout counter, and a receipt is issued in response to a payment at the checkout counter.

Figure 3:
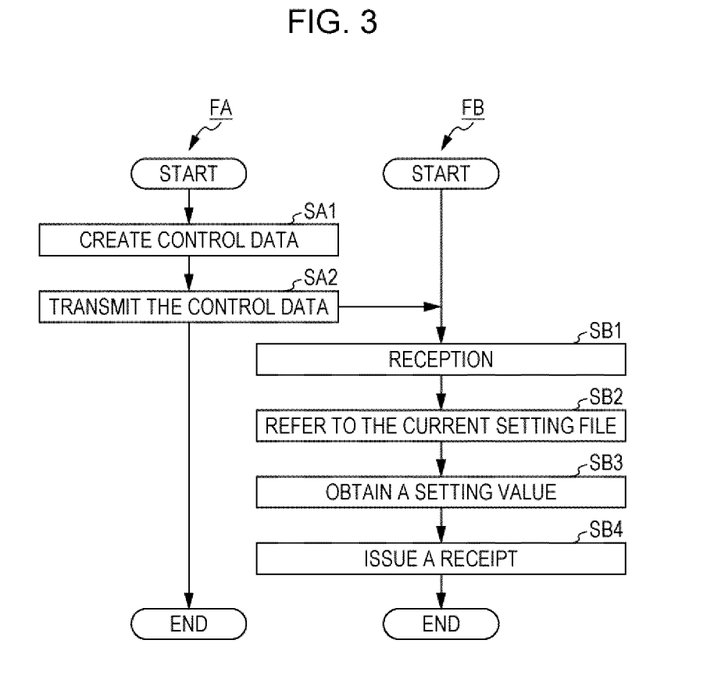
FIG. 3 is a flowchart illustrating the operation of a host computer and a printer.

FIG. 3 is a flowchart illustrating the operation of the host computer 3 and the printer 1 when a receipt is issued. In FIG. 3, a flowchart FA is a flowchart illustrating the operation of the host computer 3, and a flowchart FB is a flowchart illustrating the operation of the printer 1.

As illustrated by the flowchart FA in FIG. 3, the host computer 3 generates control data by a predetermined application and the function of the printer driver (step SA1). The control data is data for instructing to issue a receipt and includes a plurality of control commands that execute the processing necessary for causing the printer 1 to issue a receipt.

Next, the host computer 3 transmits the control data generated in step SA1 to the printer 1 (step SA2).

As illustrated by the flowchart FB in FIG. 3, the control section 20 of the printer 1 receives the control data by controlling the communicator 22 (step SB1). The individual control commands included in the received control data are stored in an unillustrated reception buffer included in the memory 21 in sequence.

Next, the control section 20 refers to the current setting file SFG (step SB2).

The current setting file SFG is a file in which identification information (hereinafter referred to as "setting item identification information") that identifies a setting item and a setting value set in the setting item are described in association with each other for a plurality of setting items. A setting item is an item that defines each of the settings regarding the printer 1, such as the setting regarding printing performed by the printer 1, the setting regarding communication performed by the printer 1, or the like. A setting value is associated with each setting item.

In the present embodiment, as a setting item regarding printing, at least a setting item regarding a print speed (hereinafter referred to as a "print speed setting item") is provided. Also, in the present embodiment, as a setting value settable in a print speed setting item, "high speed", "medium speed", and "low speed" are provided. The setting items regarding printing may include, for example, a setting item regarding a font, a setting item regarding a print density, a setting item regarding a margin, or the like in addition to the setting item regarding a print speed. Also, as a setting item regarding communication, for example, a setting item regarding a communication standard used for the communication is provided.

The current setting file SFG differs from the first setting file SF1 and the second setting file SF2 that are described later in the point that a setting value of a setting item obtained and used at the time when the printer 1 performs processing is stored. That is to say, when the control section 20 performs various kinds of processing, the control section 20 refers to and uses not the first setting file SF1 and the second setting file SF2 that are described later but the current setting file SFG.

In the following, a setting value described in the current setting file SFG is suitably referred to as a "current setting value".

After the control section 20 refers to the current setting file SFG in step SB2, the control section 20 obtains a setting value of the setting item regarding printing (step SB3). In step SB3, the control section 20 obtains at least a setting value of the print speed setting item.

Next, the control section 20 controls the printing mechanism 23 by reflecting (using) the setting value obtained in step SB3 so as to issue a receipt (step SB4). In step SB4, the control section 20 reads and executes the control commands stored in the reception buffer in sequence so as to perform the following processing. That is to say, the control section 20 controls the transport mechanism to suitably transport the roll paper R in a predetermined direction, controls the print mechanism to print an image corresponding to the information regarding a payment on the roll paper R, and controls the cutting mechanism to cut the roll paper R at a predetermined position so as to issue a receipt. When the control section 20 performs various kinds of processing regarding the issue of a receipt, the control section 20 performs processing by reflecting the setting value obtained in step SB3. When the control section 20 performs various kinds of processing, the control section 20 carries out the processing by reflecting the setting value of the related setting item. For example, when the setting value of the print speed setting item is "high speed", the control section 20 controls the transport mechanism and the print mechanism with a speed corresponding to the setting value "high speed" so as to perform the processing related to printing.

Next, a description will be given of a basic process flow from when the printer 1 is manufactured until when the printer 1 arrives at a user's place and is used with the first setting file SF1 and the second setting file SF2.

Figure 4:
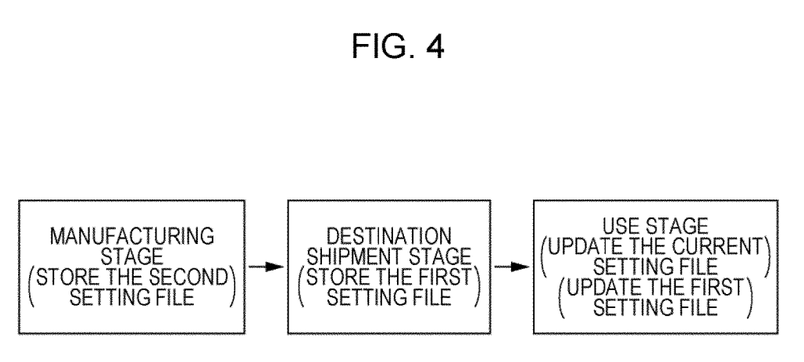
FIG. 4 is a diagram illustrating a process flow after a printer is manufactured.

FIG. 4 is a diagram illustrating a basic process flow from when the printer 1 is manufactured until when the printer 1 arrives at a user's place and is used.

At the Manufacturing Stage

At the manufacturing stage, the printer 1 is manufactured at a predetermined factory. The devices having common specifications of the printer 1 are produced in large quantities for each model at the predetermined factory. As described later, the printers 1 manufactured at the predetermined factory are grouped for each destination and are shipped to each destination.

At the manufacturing stage, the setting information is stored in the second setting file SF2 of the memory 21 at a predetermined timing. The second setting file SF2 is a file in which setting item identification information and setting values are described in association with each other for each setting item in the same manner as the current setting file SFG. For each setting item, the setting value described in the second setting file SF2 is the same value if the model of the printer 1 is the same regardless of the destination of the printer 1, the customer specifications, and the like. That is to say, the printer 1 of the same model has the same contents of the second setting file SF2 regardless of the destination, the customer specifications, and the like. Also, the setting value described in the second setting file SF2 is basically not a null value but a specific value that specifies the operation of the printer 1, or the like excluding a predetermined exception. It becomes possible for the printer 1 to perform a series of operation, such as printing, or the like using the setting values described in the second setting file SF2.

In this regard, the memory, such as a ROM in the memory 21, and the like are formatted at the manufacturing stage, and thus the stored data becomes null values. A null value is either 0 or 1 in the case of one bit. In the case of a plurality of bits, null values are either consecutive 0s or consecutive 1s. After formatting, if no data is written in the memory 21, the values remains null values.

A setting value described in the second setting file SF2 is suitably referred to as a "default value". That is to say, a default value is a setting value set in the setting item at the time of manufacturing the printer 1. A default value corresponds to the "second setting value".

For example, storing the second setting file SF2 in the memory 21 is carried out as follows. That is to say, when the second setting file SF2 is stored in the memory 21, the printer 1 including a substrate on which the control section 20 and the memory 21 are mounted is connected to a predetermined device. The control section 20 of the printer 1 receives a control command that instruct to store the second setting file SF2 in the memory 21 and the second setting file SF2. The control section 20 of the printer 1 stores the second setting file SF2 in the memory 21 on the basis of the received control command.

Also, for example, storing the second setting file SF2 in the memory 21 is carried out as follows. That is to say, the current setting file SFG in which a setting value of each setting item is described is stored in the memory 21 by certain measures. Next, the current setting file SFG stored in the memory 21 is duplicated by certain measures so that the second setting file SF2 is stored in the memory 21.

The method of storing the second setting file SF2 in the memory 21 at the manufacturing stage is not limited to the exemplified methods, and any method may be employed.

For example, using a writing device, such as a ROM writer, or the like, the file may be directly written in the ROM of the memory 21 before mounting the memory 21 on the substrate, or the file may be written in the memory 21 after having been mounted on the substrate via the wiring.

At the manufacturing stage, the timing when the second setting file SF2 is stored in the memory 21 corresponds to the "second timing".

At the Destination Shipping Stage

At the destination shipping stage, the printer 1 manufactured at a predetermined factory is shipped to a corresponding destination or to a customer who requests a specific specifications. Even the printers 1 of the same model sometimes have different destinations (hereinafter including customers) and have different setting values (specifications).

At the destination shipping stage, the first setting file SF1 is stored in the memory 21 at a predetermined timing. The first setting file SF1 is a file in which setting item identification information and a setting value are described in association with each other for each setting item in the same manner as the current setting file SFG.

A setting value described in the first setting file SF1 is a value in accordance with a destination for each setting item. Accordingly, a setting value described in the first setting file SF1 for a setting item of one sometimes differs depending on the destination.

As described later, a setting value described in the first setting file SF1 is used when a setting value described in the current setting file SFG is initialized in the setting file initialization processing described later.

Here, the assumed use mode of the printer 1 differs depending on the destination. Accordingly, a suitable setting value for the setting item of one sometimes differs depending on the destination. For example, when there are a first destination and a second destination, for the first destination, the setting value "high speed" is suitable as the setting value of the print speed setting item, whereas the setting value "low speed" is sometimes suitable for the second destination. The print density is sometimes set by the customer preferences. Also, the memory 21 stores various font data, and which font data is used is set depending on the destination. For example, any one of the languages, such as "English", "French", "German", or the like is set depending on the destination, and the corresponding font data is made possible for use. Also, font data indicating a currency, such as "Yen Mark (yen)" "$ (dollar)", or the like is set depending on the destination.

As stated above, a setting value that is described in the first setting file SF1 and is not a null value is suitably referred to as an "initial setting value". An initial setting value corresponds to the "first setting value".

Storing the second setting file SF2 in the memory 21 is carried out by the same method as exemplified by, for example, the method of storing the first setting file SF1 in the memory 21. However, at the destination shipping stage, the method of storing the first setting file SF1 in the memory 21 may be carried out by any method.

At the destination shipping stage, the timing when the first setting file SF1 is stored in the memory 21 corresponds to the "first timing". In this regard, the timing when the first setting file SF1 is updated by a method described later also corresponds to the "first timing".

Storing the first setting file SF1 in the memory 21 may be carried out at a factory where the printer 1 is manufactured. The storing may be carried out at the other places, for example, at a destination, a distribution center, or a sales office in order to be customized on the spot.

In this regard, the setting value described in the first setting file SF1 where the setting has not been carried out is sometimes kept as a null value.

Use Stage

At the use stage, the printer 1 shipped to the destination is disposed at a predetermined place (for example, the checkout counter of a store) and used by a user.

The user updates the current setting file SFG in accordance with the use mode of the printer 1 by certain measures. In this regard, a description will be given later of the method of updating the current setting file SFG. Updating the one setting file refers to changing the contents of the setting values described in association with the setting item identification information of one or a plurality of setting items in the one setting file. For example, when the printer 1 is disposed at the checkout counter of a store, the user changes the current setting value of the print speed setting item from the setting value "low speed" to the setting value "high speed" in accordance with the demands of the site.

Also, it is possible for the user to update the current setting file SFG on the basis of the first setting file SF1 and the second setting file SF2 by causing the printer 1 to perform the setting file initialization processing described later.

Further, at the use stage, it is possible for the user to update the first setting file SF1 by certain measures.

It is possible for the user to update the first setting file SF1 so that the contents of the first setting file SF1 becomes identical to the contents of the current setting file SFG on the basis of the current setting file SFG at least by the following method and to cause the printer 1 to save the contents of the current setting file SFG stored in the RAM, or the like to the ROM, or the like as the contents of the first setting file SF1. The fact that the contents of one setting file and the contents of the other setting file are identical means that a setting value for each setting item is identical in each of the setting files.

That is to say, the user connects a terminal to which a software tool for maintaining the printer 1 has been installed to the printer 1. The terminal may be the host computer 3. The user inputs the information necessary for the user interface provided by the software tool, and instructs to update the first setting file SF1 on the basis of the current setting file SFG. The terminal generates a control command that instructs to update the first setting file SF1 on the basis of the current setting file SFG by using the functions of the software tool, and transmits the control command to the printer 1. The control command that instructs to update the first setting file SF1 on the basis of the current setting file SFG corresponds to the "control command instructing to store the current setting value as the first setting value for the setting item".

The control section 20 of the printer 1 controls the communicator 22 to receive the control command. The control section 20 update the first setting file SF1 so that the contents of the first setting file SF1 becomes identical to the contents of the current setting file SFG on the basis of the received control command. The processing for updating the first setting file SF1 corresponds to the processing for "storing the current setting value of the setting item in the memory 21 as the first setting value".

When the printer 1 performs the setting file initialization processing described later, the current setting file SFG is updated on the basis of the first setting file SF1 and the second setting file SF2. When the setting file initialization processing is performed, the user carries out updating the first setting file SF1 on the basis of the current setting file SFG by the processing at a suitable timing for using the first setting file SF1.

Next, a description will be given of the setting file initialization processing.

The setting file initialization processing is the processing for updating the current setting file SFG on the basis of the first setting file SF1 and the second setting file SF2, and initializing the setting value described in the current setting file SFG.

Figure 5:
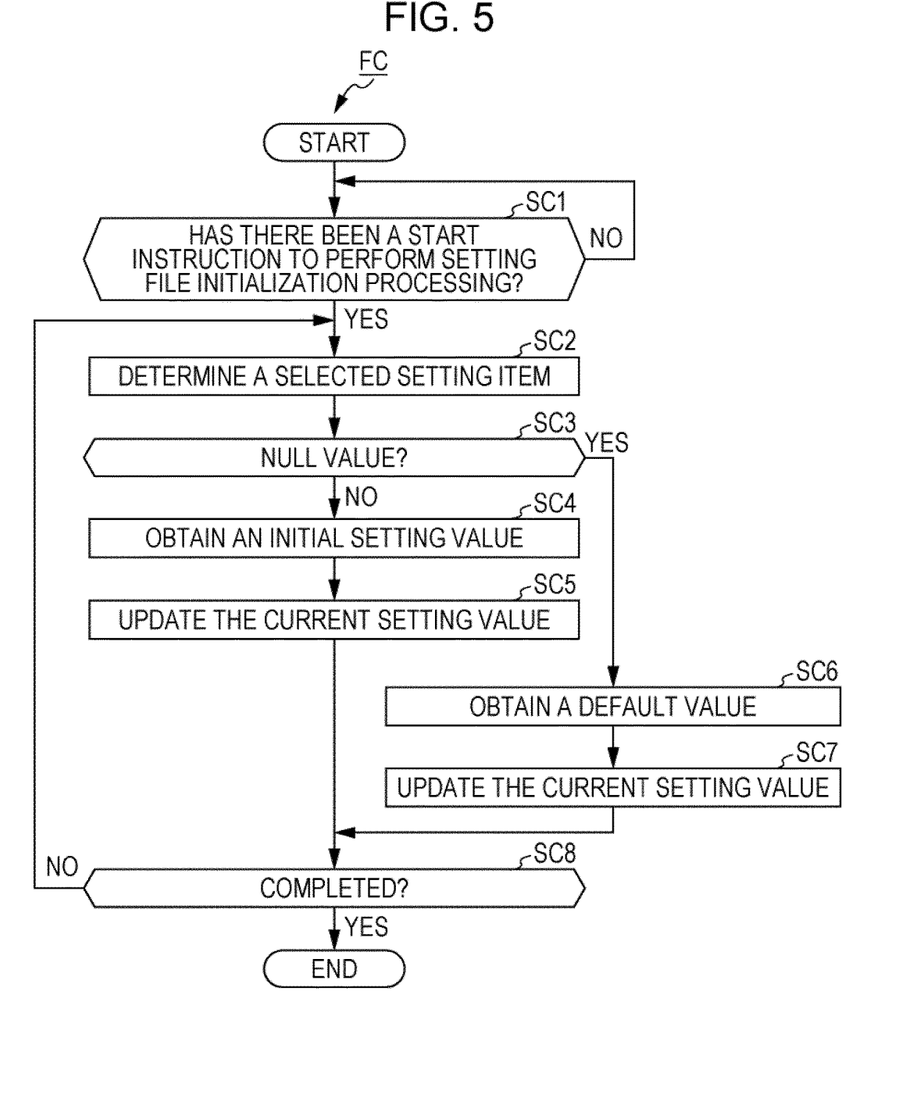
FIG. 5 is a flowchart illustrating the operation of a printer.

A flowchart FC in FIG. 5 is a flowchart illustrating the operation of the printer 1 when the setting file initialization processing is performed. Here, a description will be given of the case where the processing is performed in sequence for each setting item.

As illustrated by flowchart FC in FIG. 5, the control section 20 of the printer 1 monitors whether or not there has been an instruction to start the setting file initialization processing (step SC1).

For example, in step SC1, when the control section 20 receives a control command that instructs to start the setting file initialization processing from an external device connected to the printer 1, the control section 20 determines that the instruction to start the setting file initialization processing has been given. The external device may be a terminal to which the above-described software tool has been installed or the host computer 3.

Also, for example, in step SC1, when the control section 20 has detected that a user has performed a predetermined operation on the printer 1, the control section 20 determines that the instruction to start the setting file initialization processing has been given.

When the instruction to start the setting file initialization processing has been given (step SC1: YES), the control section 20 determines one setting item to be the target of the processing in step SC3 and the subsequent processing among the setting items in which setting values are described in the current setting file SFG (step SC2). In the following, the setting item determined in step SC2 is referred to as a "selected setting item". As will be apparent later, the setting items in which setting values are described in the current setting file SFG are determined as a selected setting item in sequence, and the processing in step SC3 and the subsequent processing is performed on the selected setting item.

Next, the control section 20 determines whether or not the setting value described in association with the selected setting item in the first setting file SF1 is a null value (step SC3). As described above, the setting value that is not a null value is an initial setting value (the first setting value).

If the setting value described in association with the selected setting item in the first setting file SF1 is not a null value (step SC3: NO), the control section 20 obtains the setting value (initial setting value) described in association with the selected setting item in the first setting file SF1 (step SC4).

Next, the control section 20 updates the setting value (current setting value) described in association with the selected setting item in the current setting file SFG on the basis of the initial setting value obtained in step SC4, and uses the current setting value for the initial setting value (step SC5).

The processing in step SC5 corresponds to the initialization processing of the current setting value.

After the processing in step SC5 is performed, the processing procedure of the control section 20 proceeds to step SC8.

On the other hand, if the setting value described in association with the selected setting item in the first setting file SF1 is a null value in step SC3 (step SC3: YES), the control section 20 obtains the setting value (default value) described in association with the selected setting item in the second setting file SF2 (step SC6).

Next, the control section 20 updates the setting value (current setting value) described in association with the selected setting item in the current setting file SFG on the basis of the default value obtained in step SC6, and uses the current setting value for a default value (step SC7).

The processing in step SC7 corresponds to the initialization processing of the current setting value.

After the processing in step SC7 is performed, the processing procedure of the control section 20 proceeds to step SC8.

In step SC8, the control section 20 determines whether or not the initialization of the setting values has been completed for all the setting items in which setting values are described in the current setting file SFG.

If the initialization of the setting values has been completed for all the setting items (step SC8: YES), the control section 20 terminates the processing. If there is a setting item having the setting value not initialized (step SC8: NO), the processing procedure of the control section 20 proceeds to step SC2.

If it becomes necessary to initialize the current setting value described in the current setting file SFG, or if the requires to perform initialization, the user causes the printer 1 to perform the setting file initialization processing. At the time of initializing the current setting value, it is not necessary for the user to individually set the current setting values of the current setting file SFG for the setting items, and the user ought to perform the setting file initialization processing. Accordingly, it is very convenient for the user. By performing the setting file initialization processing, it is possible to reflect the setting values set in the first setting file SF1 on the current setting value in preference to the second setting file SF2. For the setting values not set in the first setting file SF1, it is possible to reflect the setting values of the second setting file SF2 on the current setting value.

Also, the setting items of the first setting file SF1 may be determined whether or not the setting items are null values all at once. The setting item that is a null value is used as the setting value (default value) corresponding to the second setting file SF2, and the setting item that is not a null value is used as a setting value (initial setting value) corresponding to the first setting file SF1, and the both items may be written for update as the setting values (current setting values) in the current setting file SFG.

As described above, it is possible for the user to cause the printer 1 to update the current setting file SFG.

In the following, a description will be given of the operation of the printer 1 when the printer 1 updates the current setting file SFG in response to an instruction of the user.

Figure 6:
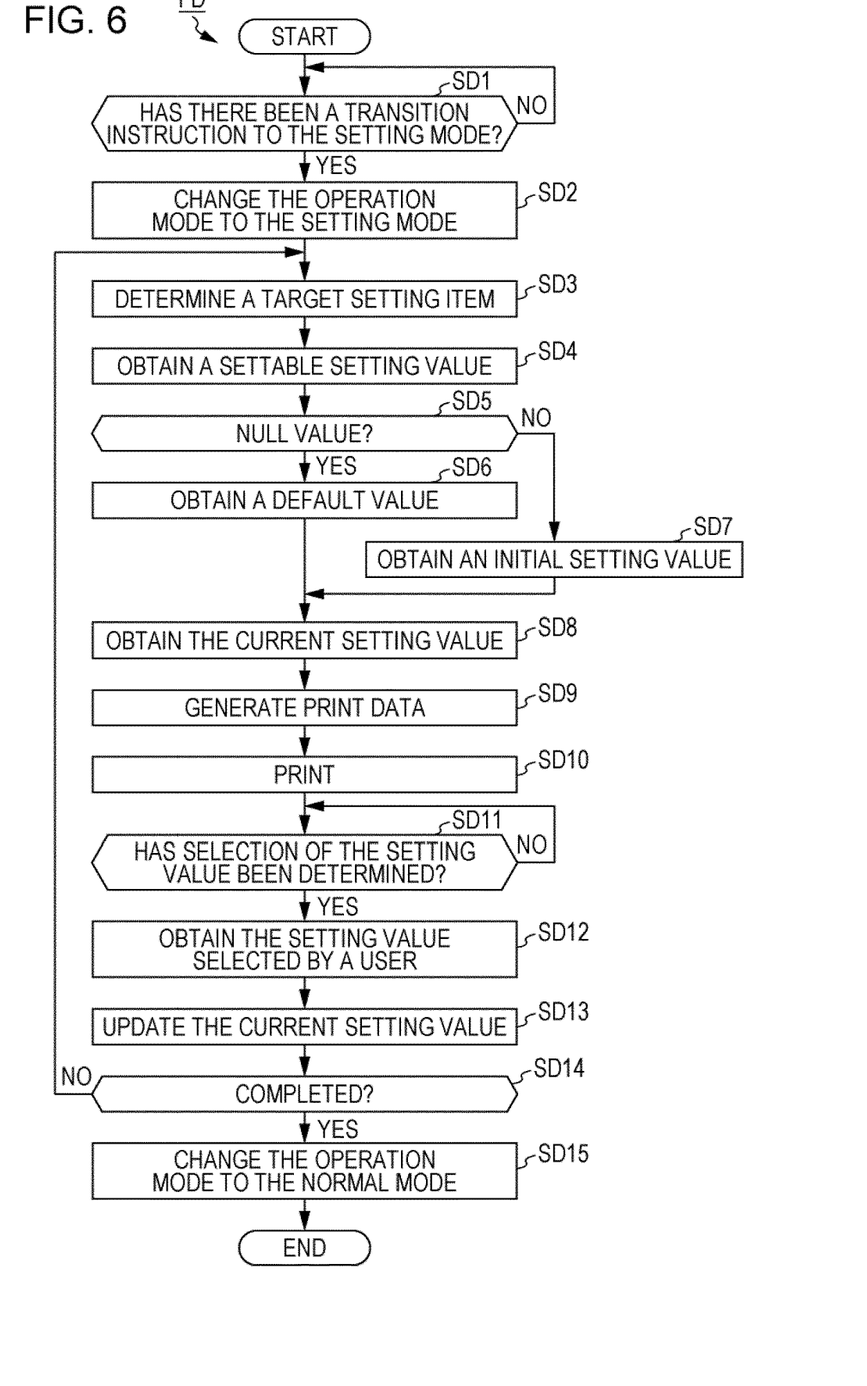
FIG. 6 is a flowchart illustrating the operation of a printer.

A flowchart FD in FIG. 6 is a flowchart illustrating the operation of the printer 1 when the current setting file SFG is updated in response to the instruction from the user.

As illustrated by the flowchart FD in FIG. 6, the control section 20 of the printer 1 monitors whether or not there has been an instruction to change the operation mode to the setting mode (step SD1).

Here, it is possible for the user to perform a specific operation on the printer 1 so as to instruct to change the operation mode to the setting mode. A specific operation is, for example, opening/closing the cover 12 in the state of pressing down the operation switch 17. The specific operation is detected by the operation switch 17 and the input section 24 of the cover switch, and the result is output to the control section 20. Also, a specific operation is, for example, pressing down the operation switch 17 a plurality of times (for example, 5 times) during a short period, such as 3 seconds, or the like. The specific operation to instruct to change the setting mode is not limited to the exemplified operation.

When the control section 20 detects that there has been an instruction to change the operation mode to the setting mode by the user performing the specific operation, the control section 20 changes the operation mode to the setting mode (step SD2).

The setting mode is an operation mode for setting the current setting value for a plurality of setting items that are predetermined and updatable on the basis of the instruction of the user by the input section 24. As described in the following, in the setting mode, the control section 20 sets each of the current setting values for the plurality of setting items that are predetermined and updatable in sequence on the basis of the instruction of the user.

Next, the control section 20 determines one setting item in which the current setting value is set out of a plurality of setting items that are determined and updatable (step SD3). In the following, a setting item determined as a setting item in which the current setting value is set is referred to as a "target setting item".

Next, the control section 20 obtains the setting values that are settable in the target setting item (step SD4). For example, when the target setting item is the print speed setting item, in step SD4, the control section 20 obtains a setting value "high speed", a setting value "medium speed", and a setting value "low speed" as the setting values settable in the target setting item.

Here, the memory 21 stores a table in which setting values settable in the described setting item are described for each setting item in association with the setting item identification information. In step SD4, the control section 20 refers to the table and obtains setting values settable in the target setting item.

Next, the control section 20 determines whether or not a setting value described in association with the target setting item in the first setting file SF1 is a null value (step SD5).

The state in which a setting value described in association with the target setting item in the first setting file SF1 is a null value corresponds to the state in which "the first setting value (initial setting value) of the setting item of one (target setting item) is not stored in the memory 21". On the other hand, the state in which a setting value described in association with the target setting item in the first setting file SF1 is not a null value corresponds to the state in which "the first setting value (initial setting value) of the setting item of one (target setting item) is stored in the memory 21.

In the first setting file SF1, if the setting value described in association with the target setting item is a null value (step SD5: YES), the control section 20 refers to the second setting file SF2, and obtains a setting value (default value) described in association with the target setting item in the second setting file SF2 (step SD6). After the processing in step SD6, the processing procedure of the control section 20 proceeds to step SD8.

On the other hand, if the setting value described in association with the target setting item is not a null value in the first setting file SF1 (step SD5: NO), the control section 20 obtains the setting value (initial setting value) described in association with the target setting item in the first setting file SF1 (step SD7). After the processing in step SD7, the processing procedure of the control section 20 proceeds to step SD8.

In step SD8, the control section 20 refers to the current setting file SFG and obtains the setting value (current setting value) described in association with the target setting item in the current setting file SFG.

Next, the control section 20 generates print data on the basis of the setting value obtained in step SD4, the default value obtained in step SD6 or the initial setting value obtained in step SD7, and the current setting value obtained in step SD8 (step SD9). The print data is data used for printing an image (hereinafter referred to as a "setting related image") corresponding to the information regarding the setting of the current setting value in the target setting item. The print data may be font data or image data corresponding to an image to be printed, or a control command for instructing to print an image.

Next, the control section 20 print the image on the roll paper R on the basis of the print data generated in step SD9 (step SD10).

Figure 7:
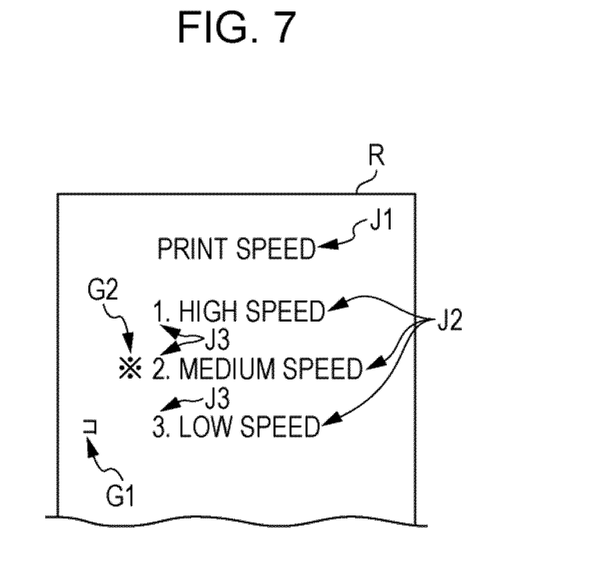
FIG. 7 is a diagram illustrating a setting related image.

FIG. 7 is a diagram illustrating an example of a setting related image that is printed on the roll paper R in step SD10.

FIG. 7 illustrates an example of a setting related image that is printed in step SD10 when the target setting item is a print speed setting item in particular.

As illustrated in FIG. 7, setting item defined information J1 indicating the target setting item is printed on the roll paper R. In the example in FIG. 7, the setting item defined information J1 is information indicating the print speed setting item. It is possible for the user to recognize the setting item that is targeted for setting the current setting value by viewing the setting item defined information J1.

Also, setting value defined information J2 indicating the setting values settable in the target setting item are printed on "lines" that are individually different on the roll paper R. It is possible for the user to recognize the setting values settable in the target setting item by viewing the setting value defined information J2.

Also, each of the number of pressing defined information J3 is printed on the roll paper R in association with each of the setting value defined information J2. The number of pressing defined information J3 is information expressing a numeric character, and the numeric values expressed by a plurality of the numbers of pressing defined information J3 differ with each other.

Here, in the present embodiment, as the modes of pressing down of the operation switch 17 by the user, selection pressing and determination pressing are defined in accordance with the time period of continuing pressing down the operation switch 17. The selection pressing is continuing pressing down for less than 2 seconds. The determination pressing is continuing pressing down for equal to or longer than for 2 seconds.

A numeric character expressed by the number of pressing defined information J3 indicates the number of times the user should perform to selection pressing when the user selects the setting value indicated by the setting value defined information J2 as the setting value set in the target setting item. When the user wants to set a setting value of 1 in the target setting item, the user recognize the number of times of selection pressing to be selected when selecting the one setting value by viewing a combination of the setting value defined information J2 and the number of pressing defined information J3 that are printed on the roll paper R. The user performs selection pressing for the predetermined number of times on the basis of the recognition so as to select the setting value of 1. Next, the user determines the selection of the setting value of 1 by carrying out determination pressing.

In this regard, the pressing down of the operation switch 17 by the user corresponds to the "input to the input section 24".

As illustrated in FIG. 7, a first image G1 (first image) is printed on the roll paper R in association with one setting value defined information J2 out of the setting value defined information J2. In the present embodiment, the first image G1 is a U-shaped image. The setting value defined information J2 with which the first image G1 is printed in association is the setting value defined information J2 corresponding to the default value obtained in step SD6 or the setting value defined information J2 corresponding to the initial setting value obtained in step SD7. That is to say, if the initial setting value of the target setting item is stored in the memory 21 (when the setting value of the target setting item described in the first setting file SF1 is not a null value), the control section 20 prints the first image G1 in accordance with the setting value corresponding to the initial setting value out of the setting values printed on the roll paper R. On the other hand, if the initial setting value of the target setting item is not stored in the memory 21 (when the setting value of the target setting item described in the first setting file SF1 is a null value), the control section 20 prints the first image G1 in association with the setting value corresponding to default value (the setting value described in the second setting file SF2) out of the setting values printed on the roll paper R.

The first image G1 is printed as described above so that the following advantages are obtained.

That is to say, as described above, when the setting file initialization processing is performed, if the initial setting value is stored in the memory 21 for a setting item of one, the current setting value of the setting item of one is updated on the basis of the initial setting value. On the other hand, if the initial setting value is not stored in the memory 21, the current setting value of the setting item of one is updated on the basis of the default value. Accordingly, the first image G1 is an image indicating the current setting value after the initialization when the setting file initialization processing is performed so that the current setting value of the target setting item is initialized. Based on this, it is possible for the user to easily and intuitively recognize the current setting value of the target setting item by viewing the setting value defined information J2 associated with the first image G1 when initialization by the setting file initialization processing has been carried out. Further, it is possible for the user to accurately select the setting value to be set in the target setting item on the basis of the recognition.

As illustrated in FIG. 7, the second image G2 (second image) is printed on the roll paper R in association with one of the setting value defined information J2 out of the setting value defined information J2. In the present embodiment, the second image G2 is an image marked with a symbol with "X" with four dots. The setting value defined information J2 printed in association with the second image G2 is the setting value defined information J2 corresponding to the current setting value obtained in step SD8. That is to say, the control section 20 prints the second image G2 in association with the setting value defined information J2 corresponding to the current setting value.

The second image G2 is printed as described above so that the following advantages are obtained.

That is to say, it is possible for the user to easily and intuitively recognize the current setting value of the target setting item at this time by viewing the setting value defined information J2 associated with the first image G1. Further, it is possible for the user to accurately select the setting value to be set in the target setting item on the basis of the recognition.

In this regard, in step SD9, the control section 20 generates suitable print data so as to print the setting related image as exemplified in FIG. 7. In this regard, if printing is carried out for each "line", when the control section 20 prints a "line" including the setting value defined information J2, the control section 20 may determine whether or not to print the first image G1 and whether or not to print the second image G2, and may print or not print the first image G1, and may print or not print the second image G2 on the basis of the determination result.

After the control section 20 printed the setting related image, the control section 20 monitors whether or not the selection of the setting value is determined (step SD11). Determining the selection of the setting value means the fact that after the user performs selection pressing for equal to or more than zero times, the user performs determination pressing for one time.

If the control section 20 detects that the selection of the setting value has been determined (step SD11: YES), the control section 20 obtains the setting value selected by the user as the setting value set in the target setting item on the basis of the number of times of selection pressing performed by the user (step SD12).

Next, the control section 20 updates the setting value associated with the target setting item in the current setting file SFG with the setting value obtained in step SD12 (step SD13). In step SD13, the current setting value of the target setting item becomes a value on which the input by the user is reflected.

Next, the control section 20 determines whether or not the setting of the setting values has been completed for all the plurality of setting items (step SD14).

Even if there is one setting item in which the setting of a setting value has not been completed (step SD14: NO), the processing procedure of the control section 20 proceeds to step SD3.

If the setting of a setting value has been completed for all the setting items (step SC14: YES), the control section 20 changes the operation mode from the setting mode to the normal mode (step SC15), and the processing is terminated.

As described above, the printer 1 according to the present embodiment includes a printing mechanism 23 that performs printing on the roll paper R (print medium) and the input section 24 that receives input. The printer 1 includes the memory 21 capable of storing, for the setting items, the current setting value set at this time, the initial setting value (the first setting value) set at a first timing, and the default value (the second setting value) set at a second timing before the first timing. The printer 1 includes the control section 20. The control section 20 causes the printing mechanism 23 to print the setting value settable in setting item of one of the setting target of the setting value on the roll paper R, and in the setting mode in which a setting value is set in the setting item of one on the basis of the input to the input section 24, if the initial setting value of the setting item of one is stored in the memory 21, the control section 20 causes the printing mechanism 23 to print the first image G1 (the first image) in association with the setting value corresponding to the initial setting value of the setting item of one out of the setting values to be printed on the roll paper R. If the initial setting value (the first setting value) of the setting item of one is not stored in the memory 21, the control section 20 causes the printing mechanism 23 to print the first image G1 in association with the setting value corresponding to the default value (the second setting value) of the setting item of one out of the setting values to be printed on the roll paper R.

With this configuration, if an initial setting value is stored in the memory 21, it is possible for the user to recognize the initial setting value out of the setting values settable in the setting item on the basis of the first image G1 printed on the roll paper R. If an initial setting value is not stored in the memory 21, it is possible for the user to recognize a default value. It is possible for the user to accurately select the setting value to be set in the setting item on the basis of the recognition and to set the selected setting value in the setting item. That is to say, with the above-described configuration, it is possible for the printer 1 to add suitable information regarding the setting on the roll paper R, and thereby it is possible for the user to accurately perform the setting.

Also, with the above-described configuration, the following advantages are obtained. That is to say, at the time of initializing the current setting value, when the initialization setting value is stored in the memory 21, if the initialization is carried out using the initialization setting value in preference to the default value, it is possible for the user to accurately recognize the current setting value after initialization in the case of having initialized the current setting value on the basis of the first image G1 printed on the roll paper R.

Also, in the present embodiment, in the setting mode, the control section 20 prints the second image G2 (the second image) different from the first image G1 in association with the setting value corresponding to the current setting value as the setting value settable in the setting item of one of the target to which the setting value is set out of the setting values printed on the roll paper R.

With this configuration, it is possible for the user to recognize the current setting value out of the setting values settable in the setting item on the basis of the second image G2 printed on the roll paper R, and to accurately perform the setting on the basis of the recognition.

Also, in the present embodiment, an initial setting value is set in accordance with the use mode after the printer 1 is manufactured, and a default value is set at the time of manufacture.

With this configuration, it is possible to add the first image G1 to the initial setting value set in response to the use mode in preference to the initial value set at the time of manufacture out of the setting values settable in the setting item at the time of printing an image regarding the setting on the roll paper R.

Also, in the present embodiment, the printer 1 includes a communicator 22 that communicate with an external device. When the control section 20 receives a control command for instructing to store the current setting value as an initial setting value for the setting item via the communicator 22, the control section 20 stores the current setting value of the setting item as an initial setting value in the memory 21 on the basis of the received control command.

With this configuration, the external device transmits the control command to the printer 1 so as to store the current setting value in the memory 21 as the initial setting value.

In this regard, the above-described embodiments reveals only an aspect to the invention, and it is possible to modify and make use of the embodiments in any form within the spirit and scope of the invention.

For example, in the above-described embodiment, the descriptions have been given of the modes of the first image G1 and the second image G2 by taking specific examples. However, these modes of the images are not limited to the exemplified modes. Also, the contents of the setting related image is not limited to the exemplified contents.

Also, in the present embodiment, the printer 1 is a thermal-type printer. However, the printing method of the printer 1 is not limited to a thermal type, and may be any type, such as an ink jet type, a dot impact type, or the like.

Also, it is possible to realize each functional block described with reference to the drawings by hardware and software freely, and each functional block does not indicate a specific hardware configuration.

What is claimed is:
1. A printer comprising:
 a display section that comprises a light emitting diode (LED) but does not include a display panel;
 a printing mechanism configured to print on a print medium;
 an input section configured to receive an input;

a memory capable of storing, for each of a plurality of setting items:
- a current setting value that is updatable,
- a default setting value, and
- an initial setting value that is settable at a time later than that of the default setting value; and a processor configured to operate in a setting mode in which:
- when the initial setting value of a target setting item is stored in the memory, the processor causes the printing mechanism to print a first image using the initial setting value of the target setting item that is stored in the memory, and
- when the initial setting value of the target setting item is not stored in the memory, the processor causes the printing mechanism to print the first image using the default setting value of the target setting item that is stored in the memory, and
- the processor causes the printing mechanism to print a second image different from the first image using the current setting value of the target setting item that is stored in the memory;

wherein the processor is configured to update the current setting value of the target setting item on the basis of input to the input section.

2. The printer according to claim 1, wherein the initial setting value is stored in the memory at a shipping stage, and the default setting value is stored in the memory before being implemented on a substrate or after being implemented on the substrate at a manufacturing stage.

3. The printer according to claim 1, wherein the initial setting value includes a setting of font data stored in the memory.

4. The printer according to claim 1, wherein the processor is configured such that, when the initial setting value of the target setting item stored in the memory is a null value, the processor determines that the initial setting value is not stored in the memory.

5. The printer according to claim 1, wherein the processor is configured to control the printing mechanism so as to print the first image on a same line with the initial setting value or the default setting value.

6. The printer according to claim 1, further comprising:
a communicator configured to communicate with an external device,
wherein the processor is configured such that, when for the target setting item, the processor receives a control command instructing to store the current setting value as the initial setting value via the communicator, the processor stores the current setting value of the target setting item as the initial setting value in the memory on the basis of the received control command.

7. A method of controlling a printer that comprises
a display section that comprises a light emitting diode (LED) but does not include a display panel, a printing mechanism configured to print on a print medium, an input section configured to receive an input, and a memory capable of storing, for each of a plurality of setting items:
- a current setting value that is updatable,
- a default setting value, and
- an initial setting value that is settable at a time later than that of the default setting value, the method comprising:
  operating in a setting mode, which comprises:
  - when the initial setting value of a target setting item is stored in the memory, causing the printing mechanism to print a first image using the initial setting value of the target setting item that is stored in the memory,
  - when the initial setting value of the target setting item is not stored in the memory, causing the printing mechanism to print the first image using the default setting value of the target setting item that is stored in the memory, and
  - causing the printing mechanism to print a second image different from the first image using the current setting value of the target setting item that is stored in the memory; and
  - updating the current setting value of the target setting item on the basis of input to the input section.

8. The method of controlling a printer, according to claim 7, wherein the initial setting value is stored in the memory at a shipping stage, and the default setting value is stored in the memory before being implemented on a substrate or after being implemented on the substrate at a manufacturing stage.

9. The method of controlling a printer, according to claim 7, wherein the initial setting value includes involvement in a setting of font data stored in the memory.

10. The method of controlling a printer, according to claim 7, wherein when the initial setting value of the target setting item stored in the memory is a null value, the processor determines that the initial setting value is not stored in the memory.

11. The method of controlling a printer, according to claim 7, wherein the causing the printing mechanism to print the first image on a same line with the initial setting value or the default setting value.

12. The method of controlling a printer, according to claim 7, further comprising:
when for the target setting item, receiving a control command instructing to store the current setting value as the initial setting value from an external device, storing the current setting value of the target setting item as the initial setting value in the memory on the basis of the received control command.

* * * * *